(12) United States Patent
Bokil et al.

(10) Patent No.: US 10,868,432 B2
(45) Date of Patent: Dec. 15, 2020

(54) BATTERY PACK, ELECTRONIC DEVICE, AND METHOD OF CONTROLLING BATTERY PACK

(71) Applicant: MURATA MANUFACTURING CO., LTD., Kyoto (JP)

(72) Inventors: Harshad Bokil, Kyoto (JP); Yusuke Toda, Kyoto (JP); Keisuke Saito, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 16/437,850

(22) Filed: Jun. 11, 2019

(65) Prior Publication Data

US 2019/0296564 A1 Sep. 26, 2019

Related U.S. Application Data

(63) Continuation of application No. PCT/JP2017/034503, filed on Sep. 25, 2017.

(30) Foreign Application Priority Data

Dec. 12, 2016 (JP) ................. 2016-240472

(51) Int. Cl.
*H02J 7/00* (2006.01)
*H01M 2/10* (2006.01)
(Continued)

(52) U.S. Cl.
CPC ......... *H02J 7/0026* (2013.01); *H01M 2/1077* (2013.01); *H01M 2/34* (2013.01);
(Continued)

(58) Field of Classification Search
CPC ....................................................... H02J 7/00
See application file for complete search history.

(56) References Cited

U.S. PATENT DOCUMENTS

2009/0124299 A1* 5/2009 Suzuki .................. H02J 7/0031
320/153

FOREIGN PATENT DOCUMENTS

JP 09-243718 9/1997
JP 2007124768 A 5/2007
(Continued)

OTHER PUBLICATIONS

Japanese Office Action dated Apr. 21, 2020 in corresponding Japanese Application No. 2018-556198.
(Continued)

*Primary Examiner* — Robert Grant
(74) *Attorney, Agent, or Firm* — K&L Gates LLP (57) ABSTRACT

A battery pack includes a battery section including one or a plurality of battery cells, a microcomputer configured to communicate with outside, a power supply terminal connected to the battery section, a communication terminal of the battery pack connected to a communication terminal of the microcomputer, a high voltage detector configured to detect high voltage by comparing voltage applied to the communication terminal of the battery pack with a preset threshold value, and a switch configured to disconnect the communication terminal of the microcomputer from the communication terminal of the battery pack in response to an output from the high voltage detector.

11 Claims, 7 Drawing Sheets

(51) Int. Cl.
*H01M 2/34* (2006.01)
*H01M 10/48* (2006.01)
*H02H 7/20* (2006.01)

(52) U.S. Cl.
CPC .............. *H01M 10/48* (2013.01); *H02H 7/20* (2013.01); *H02J 7/00* (2013.01); *H01M 2220/20* (2013.01); *H02J 7/00045* (2020.01)

(56) References Cited

FOREIGN PATENT DOCUMENTS

JP        2007325439 A    12/2007
JP        2014195398 A    10/2014

OTHER PUBLICATIONS

International Search Report for Application No. PCT/JP2017/034503, dated Oct. 31, 2017.

* cited by examiner

BATTERY PACK, ELECTRONIC DEVICE, AND METHOD OF CONTROLLING BATTERY PACK

CROSS REFERENCE TO RELATED APPLICATIONS

The present application is a continuation of PCT patent application no. PCT/JP2017/034503, filed on Sep. 25, 2017, which claims priority to Japanese patent application no. JP2016-240472 filed on Dec. 12, 2016, the entire contents of which are being incorporated herein by reference.

BACKGROUND

The present technology generally relates to a battery pack, an electronic device, an electric vehicle, and an electric power system that use, for example, a lithium ion secondary battery, and a method of controlling the battery pack.

The battery pack has, in addition to the secondary battery, a microcomputer incorporated therein for communicating with an external device. Communication is performed for authentication with the external device, for example. This battery pack is provided with power source terminals that output positive and negative voltage and a communication terminal of the microcomputer.

Battery packs, in which a plurality of battery cells are connected in series and/or in parallel to output comparatively high voltage, are known. Hence, there is a risk that high voltage might be applied to the communication terminal due to a short circuit between one of the power source terminals and the communication terminal of such a battery pack outside the battery pack.

SUMMARY

The present technology generally relates to a battery pack, an electronic device, an electric vehicle, and an electric power system that use, for example, a lithium ion secondary battery, and a method of controlling the battery pack.

An object of the present technology is to provide a battery pack and a method of controlling the battery pack so as to prevent a failure of a microcomputer thereof that would be caused by high voltage due to comparatively high voltage output from the battery pack being applied to a communication terminal of the microcomputer.

According to an embodiment of the present disclosure, a battery pack is provided. The battery pack includes a battery section including one or a plurality of battery cells, a microcomputer configured to communicate with outside, a power supply terminal connected to the battery section, a communication terminal of the battery pack connected to a communication terminal of the microcomputer, a high voltage detector configured to detect a high voltage by comparing voltage applied to the communication terminal of the battery pack with a preset threshold value; and a switch configured to disconnect the communication terminal of the microcomputer from the communication terminal of the battery pack in response to an output from the high voltage detector.

According to an embodiment of the present disclosure, a method of controlling a battery pack including a battery section including one or a plurality of battery cells, a microcomputer configured to communicate with outside, a power supply terminal connected to the battery section, and a communication terminal of the battery pack connected to a communication terminal of the microcomputer is provided. The method includes
 detecting a high voltage by comparing voltage applied to the communication terminal of the battery pack with a preset threshold value, and
 disconnecting the communication terminal of the microcomputer from the communication terminal of the battery pack when the high voltage is detected.

According to an embodiment of the present disclosure, an electronic device configured to receive electric power supply from the battery pack as described herein is provided.

According to at least one embodiment, when high voltage is applied to the communication terminal of the battery pack, the high voltage can be blocked from being applied to the communication terminal of the microcomputer, which can prevent a crash of the microcomputer.

It should be understood that advantageous effects are not necessarily limited to the advantageous effects described herein and other suitable properties relating to the present technology may be realized and as further described.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
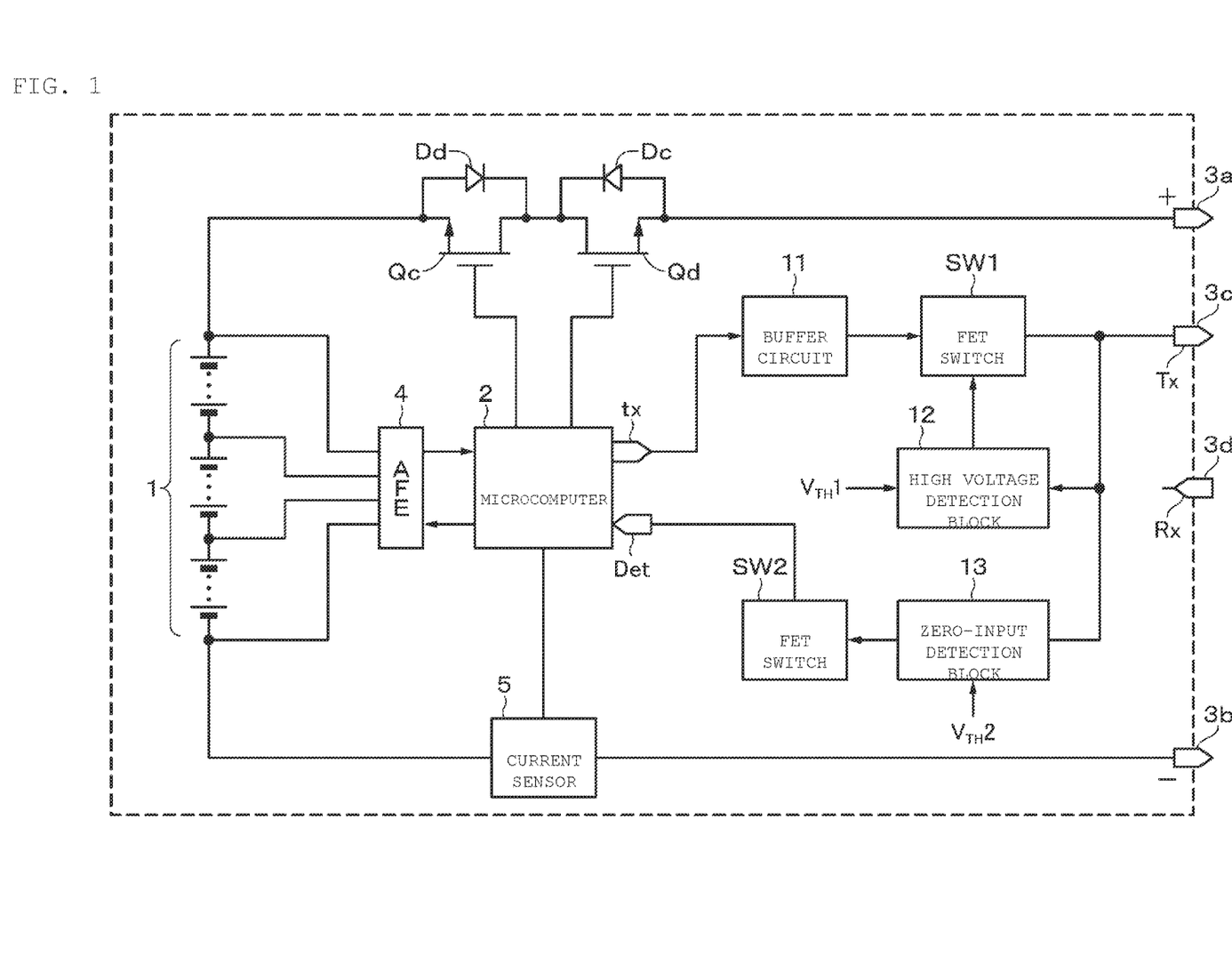
FIG. 1 is a block diagram according to an embodiment of the present technology.

In an embodiment of the present disclosure, as shown in FIG. 1, the present disclosure is applied to a battery pack having a battery section 1 in which a plurality of battery cells are connected in series and/or in parallel, a microcomputer 2, and relevant elements contained in the same housing (case). The battery cells are, for example, lithium ion secondary batteries.

The battery pack is provided with terminals 3a, 3b, 3c, and 3d for connection to the outside. The terminal 3a is connected to the positive electrode of the battery section 1 and the terminal 3b is connected to the negative electrode of the battery section 1. The terminals 3c and 3d are terminals for communication between the microcomputer 2 and the outside.

The terminal 3c is a transmission terminal Tx that outputs transmission data to an external device and the terminal 3d is a reception terminal Rx that receives data from an external device. In the following description, the terminal 3c is referred to as the transmission terminal Tx and the terminal 3d is referred to as the reception terminal Rx. As a communication method, a communication interface such as a Universal Asynchronous Receiver-Transmitter (UART) or an RS232C interface can be used.

Voltage information of each cell of the battery section 1 is supplied to the microcomputer 2 via an Analog Front End (AFE) 4. The AFE 4 is an analog circuit disposed between an analog signal section and a CPU of the microcomputer 2.

The microcomputer 2 that controls the battery pack is configured with, for example, a Central Processing Unit (CPU) or a processor, a Random Access Memory (RAM), a Read Only Memory (ROM), an Input/Output (I/O), and the like. In the battery pack, a switching element Qc that turns ON/OFF a charging current and a switching element Qd that turns ON/OFF a discharging current are provided and these switching elements Qc and Qd are controlled by the microcomputer 2. A diode Dd is connected in parallel with the switching element Qc in a forward direction with respect to the discharging current and a diode Dc is connected in parallel with the switching element Qd in a forward direction with respect to the charging current.

Voltage from the battery section 1 is supplied to the microcomputer 2. Further, temperature in the battery pack is measured by a temperature detection element such as a thermistor (not shown) and measured temperature information is supplied to the microcomputer 2. Further, a current flowing through a current pathway of the battery section 1 is detected by a current sensor 5 and a detected current value is supplied to the microcomputer 2. The microcomputer 2 controls charging and discharging operation for the battery section 1.

A buffer circuit 11 and an FET switch SW1 are connected between a transmission terminal tx of the microcomputer 2 and the transmission terminal Tx of the battery pack. A high voltage detector (a high voltage detection block 12), and a zero-input detection block 13 that serves as an external device detector (an external device detection block) are connected to the transmission terminal Tx of the battery pack.

Turning ON/OFF of the FET switch SW1 is controlled in response to detection signals output from the high voltage detector (the high voltage detection block 12). The high voltage detection block 12 monitors voltage Vx at the transmission terminal Tx of the battery pack and determines whether the voltage Vx is equal to or larger than a preset threshold value $V_{TH}1$. If $(V \geq V_{TH}1)$ is satisfied, a high-level detection signal is generated and, if $(Vx < V_{TH}1)$ is satisfied, a low-level detection signal is generated.

The low-level detection signal turns ON the FET switch SW1. The high-level detection signal turns OFF the FET switch SW1. Turning OFF the FET switch SW1 keeps high voltage that is equal to or larger than the threshold value $V_{TH}1$ from being applied to the transmission terminal tx of the microcomputer 2, which prevents a failure of the microcomputer 2 due to the high voltage. The low-level detection signal output in the case of $(Vx < V_{TH}1)$ turns ON the FET switch SW1, which allows the microcomputer 2 to output transmission data to the transmission terminal Tx through the buffer circuit 11 and the FET switch SW1.

The zero-input detection block 13 monitors the voltage Vx at the transmission terminal Tx of the battery pack and compares the voltage Vx with a threshold value $V_{TH}2$. The threshold value $V_{TH}2$ is a voltage that is approximately equal to zero. In the case of $(Vx \leq V_{TH}2)$, it is determined that the transmission terminal Tx has been grounded by connection of an external device. Detection signals from the zero-input detection block 13 are supplied to an FET switch SW2. Outputs from the FET switch SW2 are supplied to an external load detection terminal Det of the microcomputer 2. The microcomputer 2, when detecting connection of an external device, outputs transmission data to the transmission terminal Tx.

Figure 2:
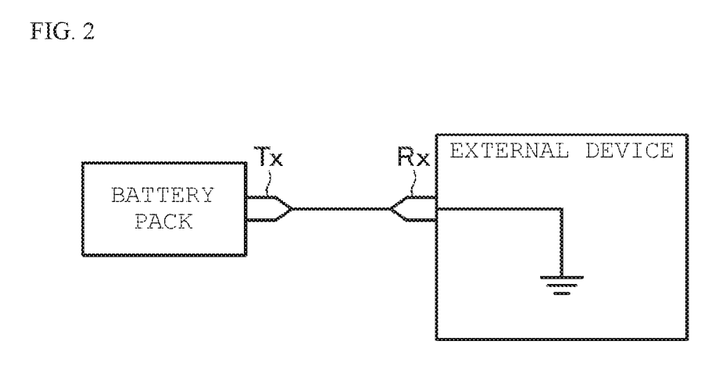
FIG. 2 is a connection diagram used for describing an embodiment of the present technology.

As shown in FIG. 2, between the battery pack and an external device, the transmission terminal Tx of the battery pack and a reception terminal Rx of the external device (for example, a microcomputer in an electric tool) are connected. The reception terminal Rx is grounded until communication with the battery pack starts. Once the communication starts, it will be possible to receive data from the transmission terminal Tx. This means that the zero-input detection block 13 detects connection of the external device to the transmission terminal Tx by detecting $(Vx \leq V_{TH}^2)$.

Figure 3:
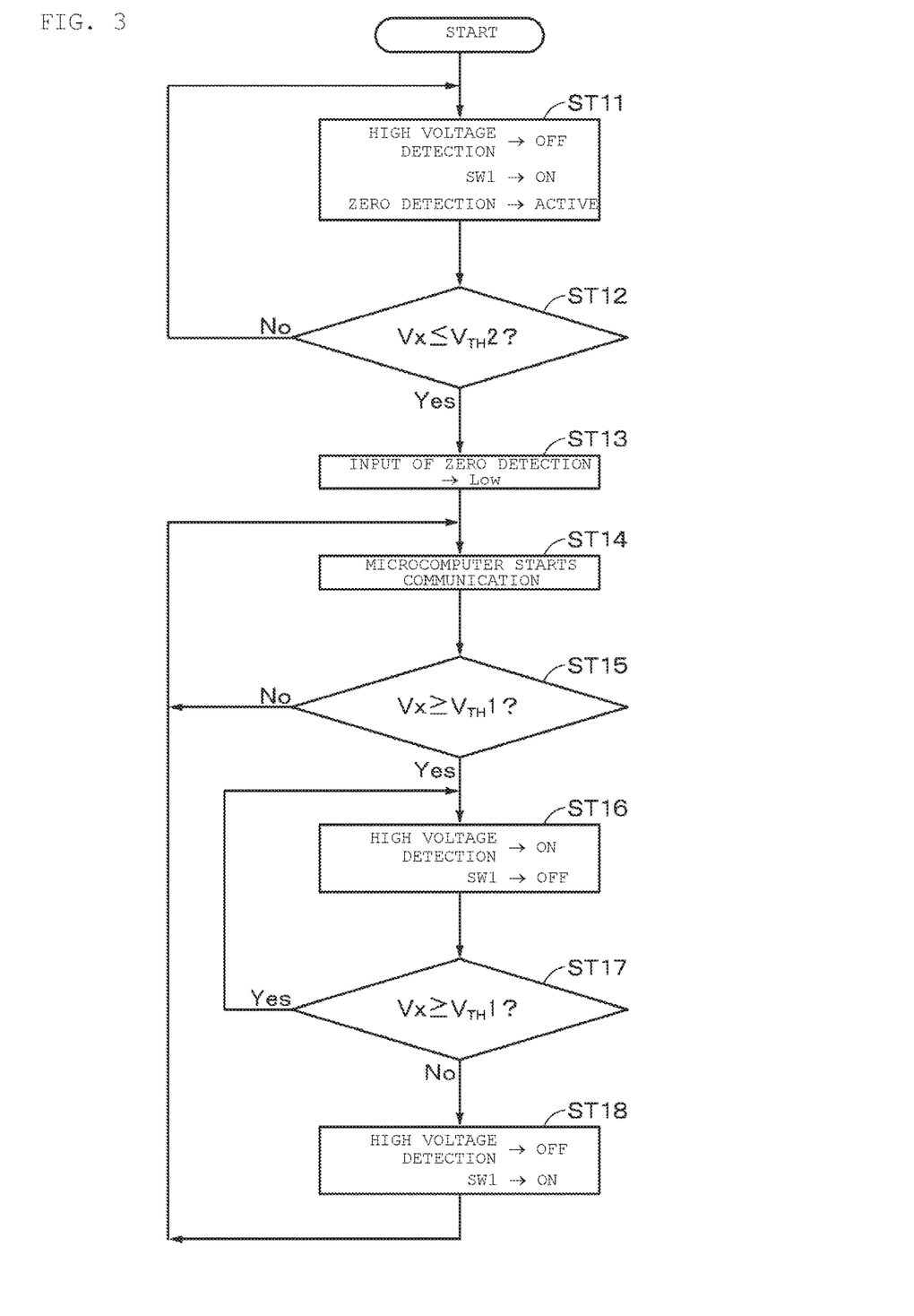
FIG. 3 is a flow chart used for describing operation of an embodiment of the present technology.

Operation of the embodiment of the present technology will be described with reference to a flow chart of FIG. 3.

Step ST11: When the operation starts by powering ON or the like, an external device detection mode is set. In this mode, an output from the high voltage detection block 12 indicates a state where high voltage is not detected (an OFF signal) and the FET switch SW1 is ON. Additionally, the zero-input detection block 13 is active and monitors whether an input becomes zero.

Step ST12: The voltage Vx at the transmission terminal Tx is compared with the threshold value $V_{TH}2$ and it is determined whether $(Vx \leq V_{TH}2)$ is satisfied. If this condition is not satisfied, the process goes back to step ST11.

Step ST13: If the condition of step ST12 is satisfied, that is, if the connection of an external device is detected, the FET switch SW2 is turned ON and the external load detection terminal Det of the microcomputer 2 is at a low level.

Step ST14: The microcomputer 2 recognizes the connection of the external device and starts communication with the external device (a normal mode). The communication is, for example, bi-directional communication and, as an example, communication for mutual authentication between the battery pack and the external device (electric tool) is performed. Upon successful authentication, discharge starts.

Step ST15: In the high voltage detection block 12, it is determined whether $(Vx \geq V_{TH}1)$ is satisfied. If this condition is not satisfied, the process goes back to step ST14 and the communication continues.

Step ST16: If the condition of step ST15 is satisfied, that is, if it is determined that high voltage is applied to the transmission terminal Tx, a protection mode is set. The high voltage detection block 12 outputs an ON signal and the FET switch SW1 is turned OFF. This leads to disconnection between the transmission terminal tx of the microcomputer 2 and the transmission terminal Tx of the battery pack, which can prevent a failure of the microcomputer 2 that would be caused by the high voltage applied to the transmission terminal tx of the microcomputer 2.

Step ST17: In the protection mode, in the high voltage detection block 12, it is determined whether $(Vx \geq V_{TH}1)$ is satisfied. If this condition is satisfied, the process goes back to step ST16. Thus, the FET switch SW1 remains OFF and the state of the disconnection between the transmission terminal tx of the microcomputer 2 and the transmission terminal Tx of the battery pack continues.

If the condition of step ST17 is not satisfied or, more specifically, if it is determined that $(Vx \leq V_{TH}1)$ is satisfied, the normal mode is set again, where the high voltage detection block 12 outputs an OFF signal and the FET switch SW1 is turned ON. Thus, the transmission terminal tx of the microcomputer 2 and the transmission terminal Tx of the battery pack are connected to each other and transmission data from the microcomputer 2 is output from the transmission terminal Tx. Then, the process goes back to step ST14.

An example of a specific circuit configuration of the embodiment will be described with reference to FIG. 4. The FET switch SW1 is configured with a P-channel Metal Oxide Semiconductor (MOS) Field Effect Transistor (FET)-Q1 and an N-channel MOSFET-Q2. Between the buffer circuit 11 and the drain of the MOSFET-Q1, a TVS (a surge absorbing element) is provided. The TVS that clamps a power source line to a predetermined voltage is arranged so as to protect the microcomputer 2 against a surge on the power source line, excessive high voltage, noise, and the like. The source of the MOSFET-Q1 is connected to the transmission terminal Tx of the battery pack.

The gate of the MOSFET-Q1 is grounded via the drain and the source of the MOSFET-Q2. Output signals of the high voltage detection block 12 are supplied to the gate of the MOSFET-Q2.

The transmission terminal Tx is connected to the high voltage detection block 12. The high voltage detection block 12 is configured with a comparator OP1. A voltage obtained by dividing a power source voltage (for example, +3.3 V) with resistances R1 and R2 is supplied as the threshold value $V_{TH}1$, to the non-inverting input terminal of the comparator OP1. A voltage obtained by dividing the voltage Vx at the transmission terminal Tx with resistances R3 and R4 is supplied to the inverting input terminal of the comparator OP1.

If (Vx<$V_{TH}1$) is satisfied, the comparator OP1 generates a high-level output (an ON signal) and the MOSFET-Q2 is turned ON. When the MOSFET-Q2 is turned ON, the switch SW1 (MOSFET-Q1) is turned ON and the transmission terminal tx of the microcomputer 2 and the transmission terminal Tx of the battery pack are connected to each other.

If (Vx≥$V_{TH}1$) is satisfied, the comparator OP1 generates a low-level output (an OFF signal) and the MOSFET-Q2 is turned OFF. When the MOSFET-Q2 is turned OFF, the switch SW1 (MOSFET-Q1) is turned OFF and the transmission terminal tx of the microcomputer 2 and the transmission terminal Tx of the battery pack are disconnected from each other. This can prevent the high voltage from being applied to the transmission terminal Tx of the microcomputer 2.

The zero-input detection block 13 is configured with a comparator OP2. The FET switch SW2 is configured with an N-channel MOSFET-Q3. The gate of the MOSFET-Q3 is connected to an output terminal of the zero-input detection block 13. The source of the MOSFET-Q3 is grounded and the drain thereof is connected to the power source line (for example, +3.3V) via a resistance and to an external device detection terminal Det of the microcomputer 2.

A voltage obtained by dividing the power source voltage (for example, +3.3V) with resistances R5 and R6 is supplied as the threshold value $V_{TH}2$ to the non-inverting input terminal of the comparator OP2 of the zero-input detection block 13. Between the power source terminal and the ground, a series circuit of a resistance R7 and a zener diode ZD is inserted and the connection point of the resistance R7 and the zener diode ZD is connected to the transmission terminal Tx via a resistance R8 and to the inverting input terminal of the comparator OP2. A reason why the zener diode ZD is inserted between the power source terminal and the ground is that, even if overvoltage is applied to the Tx, clamping the inverting input terminal of the comparator OP2 to a zener voltage prevents the overvoltage from being applied to the comparator OP2.

If no external device is connected, the transmission terminal Tx is open. In this case, the resistance R7 limits a current and reverse voltage is generated across the zener diode ZD. If no external device is connected, the reverse voltage across the zener diode ZD is larger compared to the voltage resulting from voltage division with the resistances R5 and R6 (threshold value $V_{TH}2$). That is, the relationship (Vx>$V_{TH}2$) is satisfied and the comparator outputs a low level. In this case, the MOSFET-Q3 is OFF and the external device detection terminal Det of the microcomputer 2 is at a high level. The microcomputer 2 determines that no external device is connected.

If an external device has been connected, the transmission terminal Tx is grounded. In this case, a voltage resulting from voltage division with the resistances R7 and R8 is supplied to the inverting input terminal of the comparator OP2. The voltage in this case will be a value obtained by dividing the power source voltage with the resistances R7 and R8. This voltage is arranged to be a smaller value compared to the voltage resulting from voltage division with the resistances R5 and R6 (the threshold value $V_{TH}2$). This means that the relationship (Vx≤$V_{TH}2$) is satisfied and the comparator outputs a high level. As a result, the MOSFET-Q3 is turned ON and the external device detection terminal Det of the microcomputer 2 is at a low level. Thus, the microcomputer 2 determines that an external device has been connected.

When high voltage is applied to the transmission terminal Tx, the zero-input detection block 13 mentioned above holds a predetermined voltage applied to the non-inverting input terminal of the comparator OP2 with the zener diode ZD, which can prevent a crash of the comparator OP2 due to the high voltage.

Another example of a specific circuit configuration of the embodiment will be described with reference to FIG. 5. When compared with the circuit configuration mentioned above and shown in FIG. 4, the FET switch SW1 and the high voltage detection block 13 respectively have the same configurations. As a zero-input detection block 13', a configuration with a PNP transistor Tr is used.

The transmission terminal Tx of the battery pack is connected to the cathode of a diode D1. The anode of the diode D1 is connected to the inverting input terminal of a comparator OP2. The non-inverting input terminal of the comparator OP2 is connected to a connection point of voltage dividing resistances R5 and R6. The emitter of the transistor Tr is connected to the power source line (for example, 3.3V) and the collector of the transistor Tr is grounded via a resistance R9. The connection point of the collector of the transistor Tr and the resistance R9 is connected to the inverting input terminal of the comparator OP2. The base of the transistor Tr is supplied with a threshold value $I_{Bset}$(current).

Figure 4:
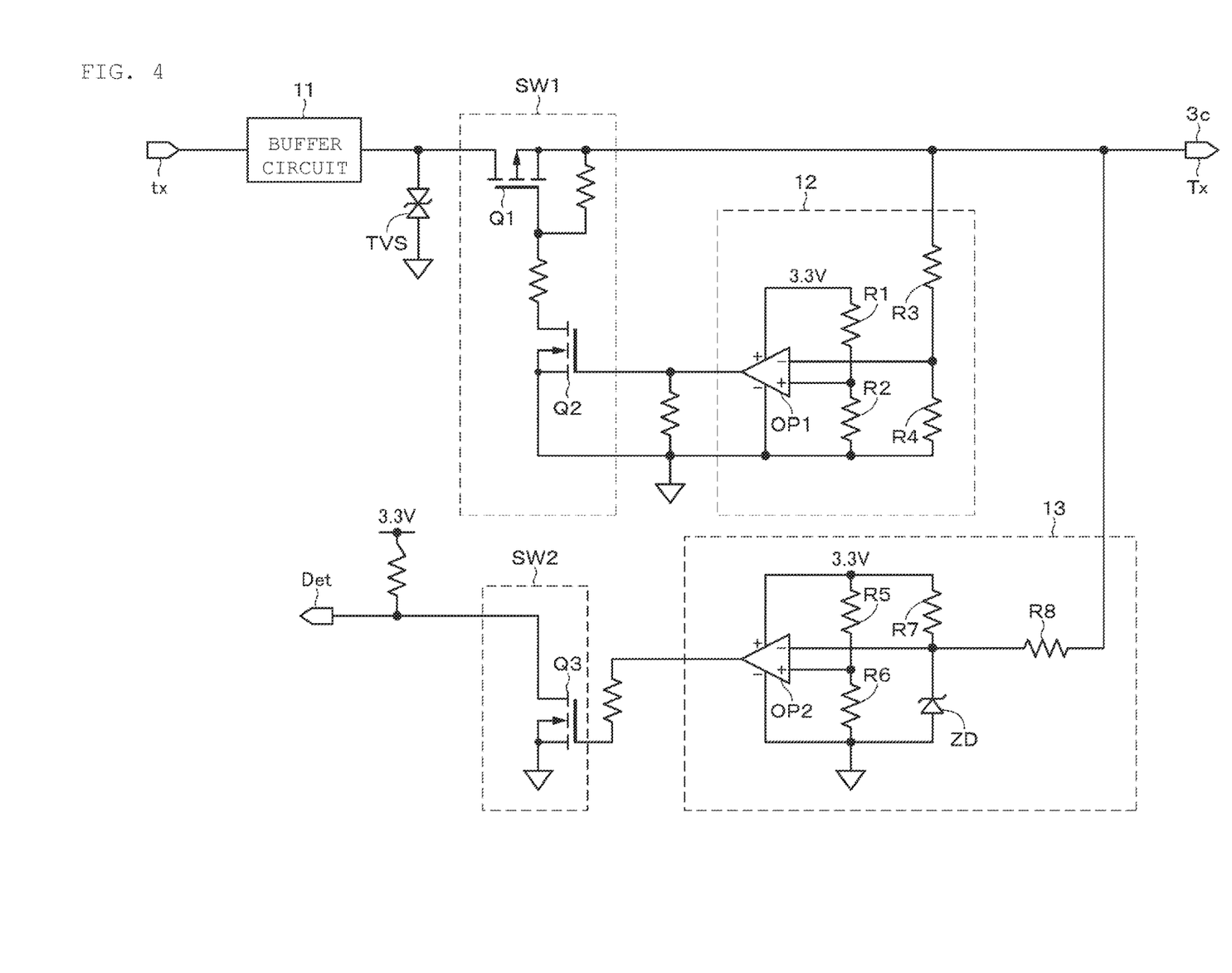
FIG. 4 is a connection diagram showing an example of a specific circuit configuration of an embodiment of the present technology.
Figure 5:
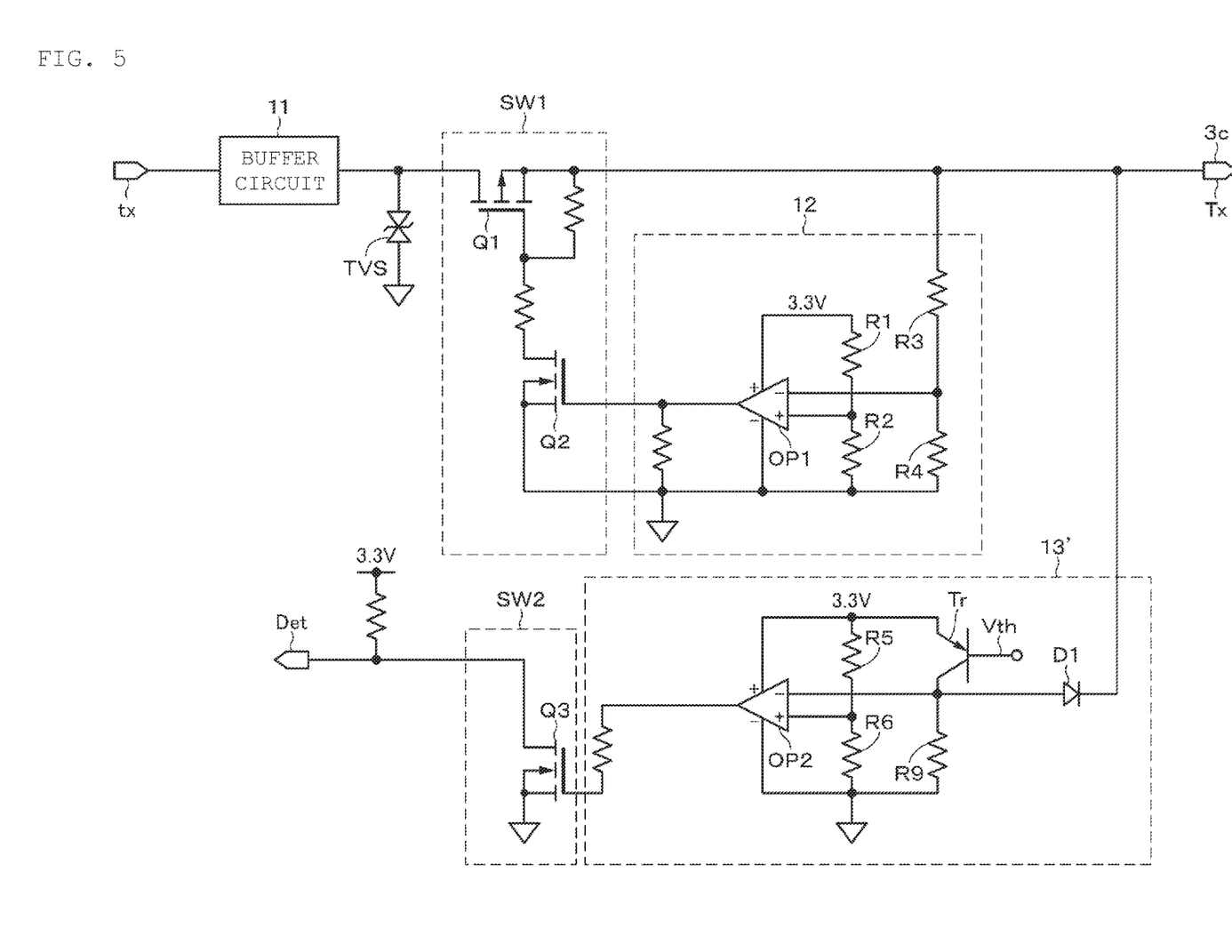
FIG. 5 is a connection diagram showing another example of a specific circuit configuration of an embodiment of the present technology.

High voltage detection and protection operation of the configuration in FIG. 5 is similar to that of the configuration in FIG. 4. Emitter potential is higher than base potential (a threshold value Vth) of the transistor Tr and a predetermined current flows through the resistance R9, which results in a voltage drop (referred to as V9) across the resistance R9. If no external device is connected to the transmission terminal Tx, the diode D1 is OFF. In this case, the voltage drop V9 is larger compared to a voltage resulting from voltage division with the resistances R5 and R6 (a threshold value $V_{TH}2$). This means that the relationship ($V9>V_{TH}2$) is satisfied and the comparator OP2 outputs a low level. In this case, the MOSFET-Q3 is OFF and the external device detection terminal Det of the microcomputer 2 is at a high level. The microcomputer 2 determines that no external device is connected.

If an external device has been connected, the transmission terminal Tx is grounded. In this case, the current flowing through the transistor Tr flows to the ground via the diode D1 and the transmission terminal Tx. A voltage in this case is approximately equal to a voltage drop in a forward direction of the diode D1 and is applied to the inverting input terminal of the comparator OP2. This voltage is arranged to be a smaller value compared to the voltage resulting from voltage division with the resistances R5 and R6 (the threshold value $V_{TH}2$). This means that the relationship (Vx≤$V_{TH}2$) is satisfied and the comparator outputs a high level. As a result, the MOSFET-Q3 is turned ON and the external device detection terminal Det of the microcomputer 2 is at a low level. Thus, the microcomputer 2 determines that an external device has been connected. Additionally, even if overvoltage is applied to the Tx, the diode D1 can protect the comparator OP2.

The battery pack according to an embodiment of the present technology mentioned above can be used in order to be mounted on or to supply electric power to, for example, an electronic device, an electric vehicle, or the like. Furthermore, the battery pack can be used as an electricity storage apparatus for a dwelling.

Examples of the electronic device include laptops, smartphones, tablet terminals, Personal Digital Assistants (PDAs), cell phones, wearable terminals, cordless handsets, video movies, digital cameras, electronic books, electronic dictionaries, music players, radios, headphones, game machines, navigation systems, memory cards, pacemakers, hearing aids, electric tools, electric shavers, refrigerators, air conditioners, televisions, stereos, water heaters, microwave ovens, dishwashers, washing machines, dryers, lightning apparatuses, toys, medical devices, robots, load conditioners, signals, and the like.

Examples of the electric vehicle include railroad vehicles, golf carts, electric carts, electric cars (including hybrid cars), and the like, each of which uses the battery pack as an electric power source for driving or an auxiliary electric power source.

Figure 6:
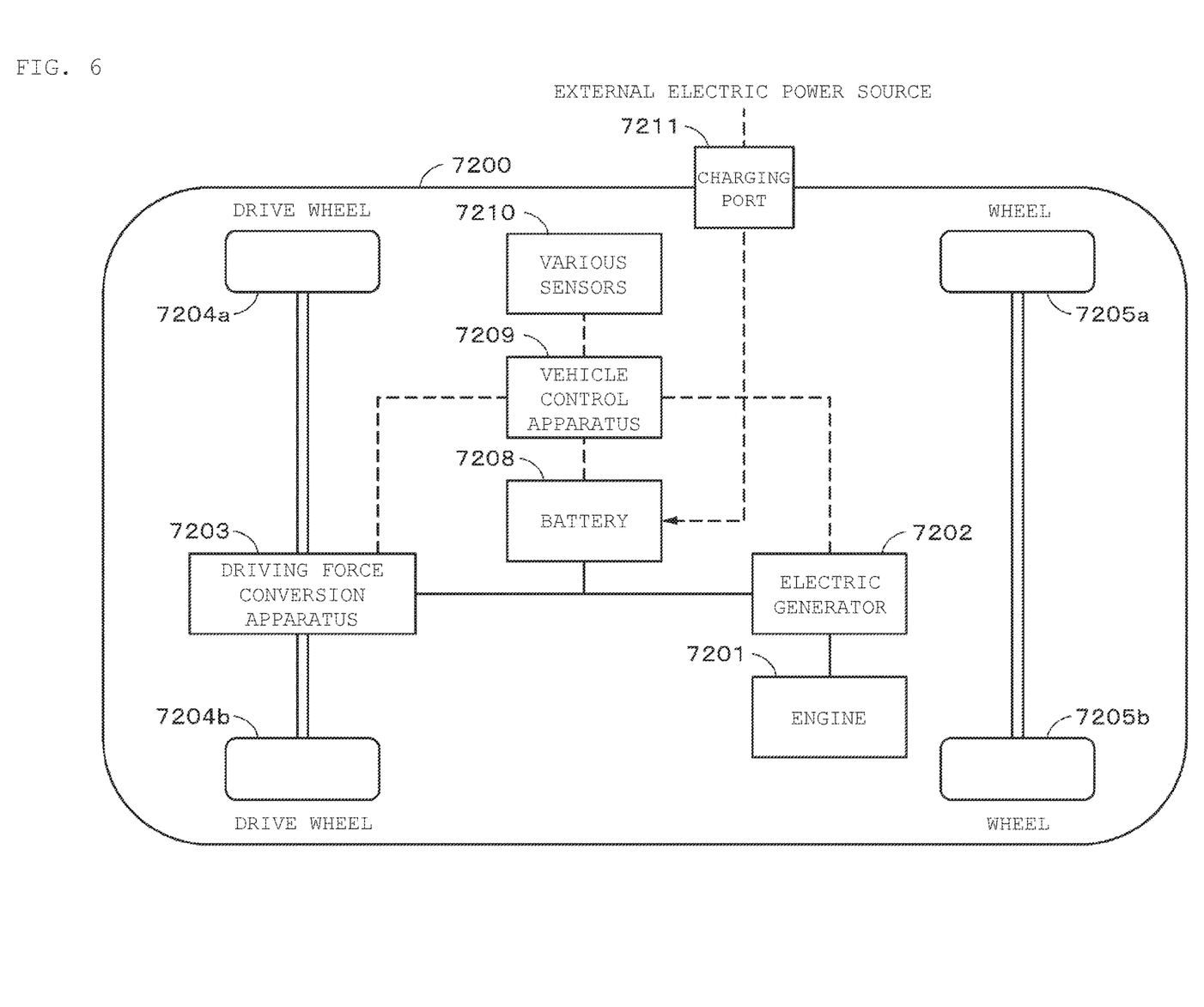
FIG. 6 is a schematic diagram schematically showing an example of a configuration of a hybrid vehicle employing a series hybrid system according to an embodiment of the present technology.

An example where the present disclosure is applied to an electricity storage system for a vehicle will be described with reference to FIG. 6. FIG. 6 schematically shows an example of a configuration of a hybrid vehicle employing a series hybrid system to which the present disclosure is applied. The series hybrid system is a car that runs with an electric power driving force conversion apparatus by using electric power generated by an electric generator powered by an engine or electric power that has been temporarily stored in a battery.

This hybrid vehicle 7200 has an engine 7201, an electric generator 7202, an electric power driving force conversion apparatus 7203, drive wheels 7204a and 7204b, wheels 7205a and 7205b, a battery 7208, a vehicle control apparatus 7209, various sensors 7210, and a charging port 7211. The electricity storage apparatus of the present disclosure mentioned above is applied to the battery 7208.

The hybrid vehicle 7200 runs by using the electric power driving force conversion apparatus 7203 as a power source. A motor is an example of the electric power driving force conversion apparatus 7203. Electric power of the battery 7208 activates the electric power driving force conversion apparatus 7203, and torque of the electric power driving force conversion apparatus 7203 is transmitted to the drive wheels 7204a and 7204b. Note that using direct current-alternating current conversion (DC-AC conversion) or reverse conversion (AC-DC conversion) at an appropriate portion makes the electric power driving force conversion apparatus 7203 applicable whether it is an alternating current motor or a direct current motor. With the various sensors 7210, rotations of the engine and an opening degree of a throttle valve not shown (throttle opening degree) are controlled by the vehicle control apparatus 7209. The various sensors 7210 include a speed sensor, an acceleration sensor, an engine rotation sensor, and the like.

Torque of the engine 7201 is transmitted to the electric generator 7202 and electric power generated by the electric generator 7202 with that torque can be accumulated in the battery 7208.

When a braking mechanism not shown decelerates the hybrid vehicle, resistance force at that time of the deceleration is applied to the electric power driving force conversion apparatus 7203 as torque. Electric power regenerated by the electric power driving force conversion apparatus 7203 with that torque is accumulated in the battery 7208.

The battery 7208 may be connected to an electric power source external of the hybrid vehicle, which makes it possible to receive electric power supply from the external electric power source by using the charging port 7211 as an input port and also to accumulate the received electric power.

Although not shown, an information processing apparatus may be provided so as to perform information processing for vehicle control based on information on a secondary battery. Examples of such an information processing apparatus include an information processing apparatus that displays a remaining battery level based on information on a remaining level of the battery and the like.

It should be understood that the series hybrid vehicle that runs with a motor by using electric power generated by the electric generator powered by the engine or electric power that has been temporarily stored in the battery has been described above as an example. However, the present disclosure is effectively applicable also to a parallel hybrid vehicle that uses output from both an engine and a motor as driving force sources and that appropriately switches between three modes for use, the modes including running with the engine alone, running with the motor alone, and running with the engine and the motor. Furthermore, the present disclosure is effectively applicable also to a so-called electric vehicle that is driven by a driving motor alone to run without an engine.

Figure 7:
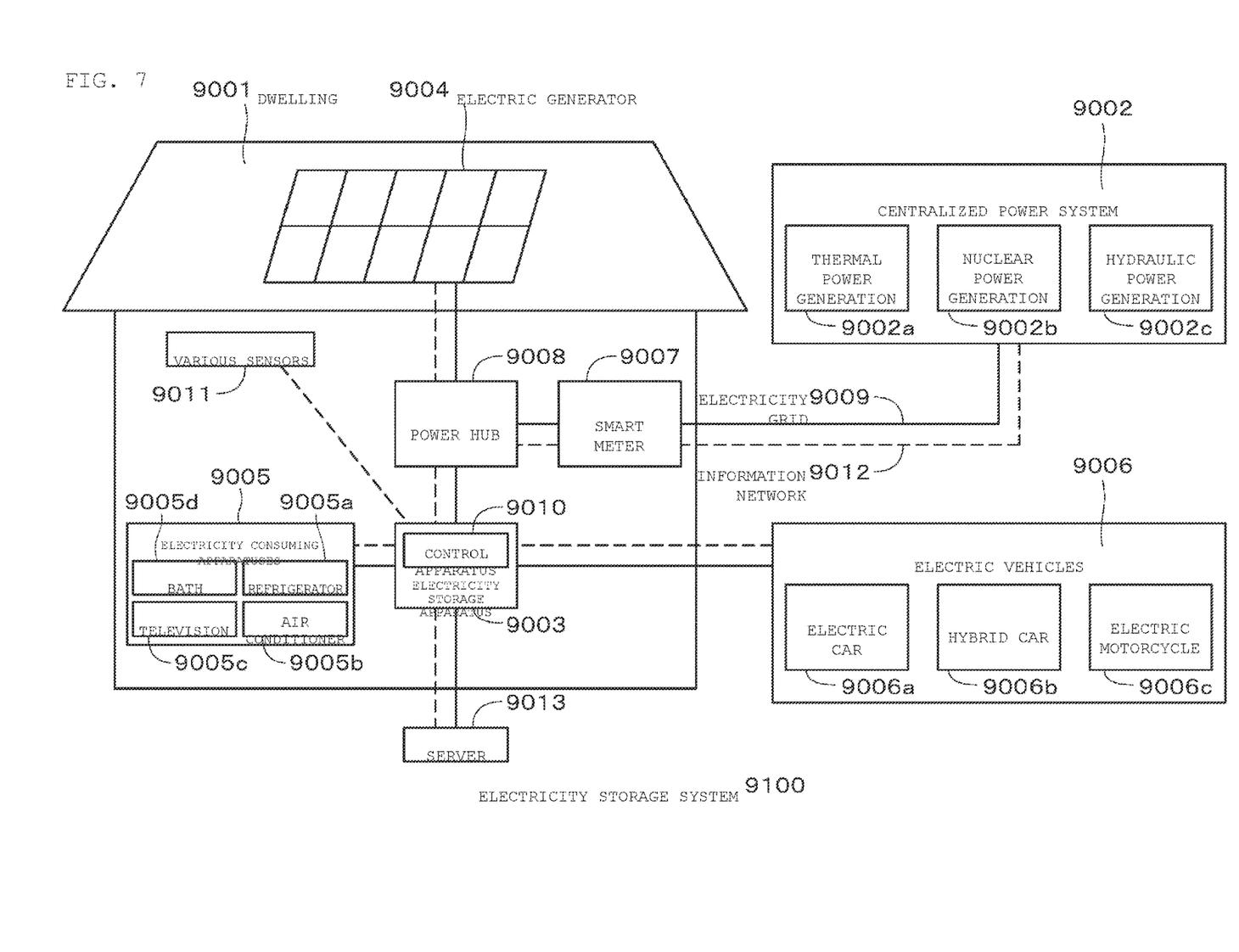
FIG. 7 is a schematic diagram showing an electricity storage system for a dwelling according to an embodiment of the present technology.

An example where the present disclosure is applied to an electricity storage system for a dwelling will be described with reference to FIG. 7. In an electricity storage system 9100 for a dwelling 9001, for example, electric power is supplied to an electricity storage apparatus 9003 from a centralized power system 9002 including thermal power generation 9002a, nuclear power generation 9002b, hydraulic power generation 9002c, and the like via an electricity grid 9009, an information network 9012, a smart meter 9007, a power hub 9008, and the like.

Along with this, electric power is supplied to the electricity storage apparatus 9003 from an independent power source such as a domestic electric generator 9004. The supplied electric power is stored in the electricity storage apparatus 9003. The electricity storage apparatus 9003 is used to supply electric power for use in the dwelling 9001.

A similar electricity storage system can be used not only for the dwelling 9001 but also for a building.

The dwelling 9001 is provided with the electric generator 9004, electricity consuming apparatuses 9005, the electricity storage apparatus 9003, a control apparatus 9010 that controls each apparatus, the smart meter 9007, and sensors 9011 that acquire various information. The respective apparatuses are connected to each other via the electricity grid 9009 and the information network 9012. Solar batteries, fuel batteries, or the like are utilized for the electric generator 9004 and generated electric power is supplied to the electricity consuming apparatuses 9005 and/or the electricity storage apparatus 9003. The electricity consuming apparatuses 9005 include a refrigerator 9005a, an air conditioning apparatus 9005b, a television receiver 9005c, a bath 9005d, and the like. The electricity consuming apparatuses 9005 also include electric vehicles 9006. The electric vehicles 9006 include an electric car 9006a, a hybrid car 9006b, and an electric motorcycle 9006c.

The battery unit of the present disclosure mentioned above is applied to the electricity storage apparatus 9003. The electricity storage apparatus 9003 is configured with a secondary battery or a capacitor. For example, it is configured with a lithium ion battery. The lithium ion battery may be a stationary battery or a battery used for the electric vehicle 9006. The smart meter 9007 includes a function to measure consumption of commercial electric power and to send the measured consumption to an electricity company. The electricity grid 9009 may employ any one of direct current power supply, alternating current power supply, and contactless power supply or a combination thereof.

The various sensors 9011 include, for example, a human sensor, an illuminance sensor, an object detection sensor, a power consumption sensor, a vibration sensor, a touch sensor, a temperature sensor, an infrared sensor, and the like. Information acquired by the various sensors 9011 is sent to the control apparatus 9010. Weather conditions, human conditions, and the like are obtained according to the information from the sensors 9011, which allows automatic control of the electricity consuming apparatuses 9005 to minimize energy consumption. Furthermore, the control apparatus 9010 can send information on the dwelling 9001 to the external electricity company or the like via the internet.

The power hub 9008 performs processing such as distribution of an electric power line and DC-AC conversion. Examples of a communication method of the information network 9012 connected to the control apparatus 9010 include a method using a communication interface such as a Universal Asynchronous Receiver-Transmitter (UART) and a method utilizing a sensor network in accordance with a wireless communication standard such as Bluetooth (registered trademark), ZigBee (registered trademark), and Wi-Fi (registered trademark). The Bluetooth (registered trademark) method is applied to multimedia communication and enables communication over one-to-many connection. ZigBee (registered trademark) uses the physical layer of Institute of Electrical and Electronics Engineers (IEEE) 802.15.4. IEEE 802.15.4 is the name of a standard of a short-distance wireless network that is referred to as Personal Area Network (PAN) or Wireless PAN (WPAN).

The control apparatus 9010 is connected to an external server 9013. This server 9013 may be managed by any of the dwelling 9001, the electricity company, and a service provider. The server 9013 sends and receives information such as power consumption information, life pattern information, an electricity bill, weather information, natural disaster information, and information related to electricity transactions. These kinds of information may be sent to and received from the electricity consuming apparatuses in the home (for example, the television receiver) or an apparatus outside the home (for example, a cell phone or the like). These kinds of information may be displayed on equipment with a display function, for example, the television receiver, the cell phone, Personal Digital Assistants (PDAs), or the like.

The control apparatus 9010 that controls each part is configured with a Central Processing Unit (CPU), a Random Access Memory (RAM), a Read Only Memory (ROM), and the like and, in this example, is housed in the electricity storage apparatus 9003. The control apparatus 9010 is connected to the electricity storage apparatus 9003, the domestic electric generator 9004, the electricity consuming apparatus 9005, the various sensors 9011, and the server 9013 via the information network 9012 and includes a function to, for example, adjust an amount of consumed commercial electric power and an amount of generated electric power. Note that it may include another function to, for example, conduct electricity transactions in an electricity market.

As described above, not only electric power from the centralized power system 9002 such as the thermal power 9002a, the nuclear power 9002b, and the hydraulic power 9002c but also electric power generated by the domestic electric generator 9004 (solar power generation or wind power generation) can be stored in the electricity storage apparatus 9003. This allows for control of delivering a constant amount of electric power to the outside or discharging as needed even if electric power generated by the domestic electric generator 9004 fluctuates. For example, electric power may be used in such a manner that electric power obtained by the solar power generation and late-night electric power at night when the rate is low are stored in the electricity storage apparatus 9003 and the electric power stored in the electricity storage apparatus 9003 is discharged for use in the daytime when the rate is high.

It should be understood that an example where the control apparatus 9010 is housed in the electricity storage apparatus 9003 has been described in this example but the control apparatus 9010 may be housed in the smart meter 9007 or may be configured alone. Furthermore, the electricity storage system 9100 may be used for a plurality of homes in a multi-family dwelling or for a plurality of single-family dwellings.

A technology according to the present technology may be preferably applied to the electricity storage apparatus 9003 of the configuration described above. However, the present technology supplies direct current power and, thus, requires conversion from the direct current power to alternating current power to supply it for domestic alternating current equipment.

Although an embodiment of the present technology has been specifically described above, the present technology is not limited to the embodiment mentioned above and can be variously modified based on the technical idea of the present technology. For example, a similar circuit for detection of and protection against high voltage may be provided to the reception terminal in addition to the transmission terminal of the microcomputer. Furthermore, the present technology can be also applied to a configuration using one terminal for both transmission and reception. Additionally, each of the configurations, the methods, the processes, the forms, the materials, the numerical values, and the like exemplified in the above embodiments is a mere example and a configuration, a method, a process, a form, a material, a numerical value, or the like that is different therefrom may be used as appropriate.

The present technology is described below in a further detail according to an embodiment.

(1)

A battery pack including:
a battery section constituted of one or a plurality of battery cells;
a microcomputer that communicates with the outside;
a power supply terminal connected to the battery section;
a communication terminal of the battery pack connected to a communication terminal of the microcomputer;
a high voltage detection block that detects high voltage by comparing voltage applied to the communication terminal of the battery pack with a preset threshold value; and
a switching element that disconnects the communication terminal of the microcomputer from the communication terminal of the battery pack in response to output from the high voltage detection block.

(2)

The battery pack according to (1), including an external device detection block that detects connection of an external device to the communication terminal of the battery pack.

(3)

The battery pack according (1) or (2), wherein when an external device is connected, the communication terminal of the battery pack is grounded and
the external device detection block detects almost zero voltage at the communication terminal of the battery pack.

(4)

The battery pack according to (2) or (3), wherein the external device detection block includes a comparator that compares voltage at the communication terminal of the battery pack with a preset threshold value and
is configured to control, with the comparator, a switching element connected to an external device detection terminal of the microcomputer.

(5)

The battery pack according to any one of (2) to (4), wherein the microcomputer is configured to start communication when the external device detection block detects connection of an external device.

(6)

The battery pack according to (1), wherein a surge absorbing element is provided between the communication terminal of the microcomputer and the switching element.

(7)

The battery pack according to (4), wherein a zener diode is electrically connected between the communication terminal of the battery pack and the comparator.

(8)

The battery pack according to (4), wherein a diode is provided between the communication terminal of the battery pack and the comparator, an anode of the diode is electrically connected to an input terminal of the comparator, and a cathode of the diode is electrically connected to the communication terminal.

(9)

An electronic device that receives electric power supply from the battery pack according to (1).

(10)

The electronic device according to (9), including an external device detection block that detects connection of an external device to the communication terminal of the battery pack.

(11)

The electronic device according to (9), wherein when an external device is connected, the communication terminal of the battery pack is grounded and
the external device detection block detects almost zero voltage at the communication terminal of the battery pack.

(12)

A method of controlling a battery pack that includes a battery section constituted of one or a plurality of battery cells, a microcomputer that communicates with the outside, a power supply terminal connected to the battery section, and a communication terminal of the battery pack connected to a communication terminal of the microcomputer, the method including:
detecting high voltage by comparing voltage applied to the communication terminal of the battery pack with a preset threshold value; and
disconnecting the communication terminal of the microcomputer from the communication terminal of the battery pack when the high voltage is detected.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
a battery section including one or a plurality of battery cells;
a microcomputer configured to communicate with outside;
a power supply terminal connected to the battery section;
a communication terminal of the battery pack connected to a communication terminal of the microcomputer;
a high voltage detector configured to detect high voltage by comparing voltage applied to the communication terminal of the battery pack with a preset threshold value;
a switch configured to disconnect the communication terminal of the microcomputer from the communication terminal of the battery pack in response to an output from the high voltage detector; and
an external device detector configured to detect connection of an external device to the communication terminal of the battery pack.

2. The battery pack according to claim 1, wherein when an external device is connected, the communication terminal of the battery pack is grounded and the external device detector detects a substantial zero voltage at the communication terminal of the battery pack.

3. The battery pack according to claim 1, wherein the external device detector includes a comparator configured to compare voltage at the communication terminal of the battery pack with a preset threshold value and
the external device detector is configured to control a switch connected to an external device detection terminal of a microcomputer.

4. The battery pack according to claim 1, wherein the microcomputer is configured to start communication when the external device detector detects connection of an external device.

5. The battery pack according to claim 1, wherein a surge absorbing element is provided between the communication terminal of the microcomputer and the switch.

6. The battery pack according to claim 3, wherein a zener diode is electrically connected between the communication terminal of the battery pack and the comparator.

7. The battery pack according to claim 3, wherein a diode is provided between the communication terminal of the battery pack and the comparator, an anode of the diode is electrically connected to an input terminal of the comparator, and a cathode of the diode is electrically connected to the communication terminal.

8. An electronic device configured to receive electric power supply from the battery pack according to claim 1.

9. The electronic device according to claim 8, comprising an external device detector configured to detect connection of an external device to the communication terminal of the battery pack.

10. The electronic device according to claim 8, wherein when an external device is connected, the communication terminal of the battery pack is grounded and the external device detector detects a substantial zero voltage at the communication terminal of the battery pack.

11. A method of controlling a battery pack including a battery section including one or a plurality of battery cells, a microcomputer configured to communicate with outside, a power supply terminal connected to the battery section, and a communication terminal of the battery pack connected to a communication terminal of the microcomputer, the method comprising:
　　detecting a high voltage by comparing voltage applied to the communication terminal of the battery pack with a preset threshold value;
　　disconnecting the communication terminal of the microcomputer from the communication terminal of the battery pack when the high voltage is detected; and
　　detecting connection of an external device to the communication terminal of the battery pack.

* * * * *